United States Patent
Boss et al.

(10) Patent No.: US 10,073,959 B2
(45) Date of Patent: Sep. 11, 2018

(54) SECURE AUTHENTICATION OF USERS OF DEVICES USING TACTILE AND VOICE SEQUENCING WITH FEEDBACK

(71) Applicant: INTERNATIONAL BUSINESS MACHINES CORPORATION, Armonk, NY (US)

(72) Inventors: Gregory J. Boss, Saginaw, MI (US); Diego Xirinachs Jimenez, Heredia (CR); Andrea del Pilar Macias Garcia, Guachipelín Escazu (CR); Stephen J. McConnell, Belfast (GB); Piotr Pierga, Palatine, IL (US); Stacey Ramos, Cedar Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/744,456

(22) Filed: Jun. 19, 2015

(65) Prior Publication Data
US 2016/0371477 A1    Dec. 22, 2016

(51) Int. Cl.
*G06F 21/32* (2013.01)

(52) U.S. Cl.
CPC .................................. *G06F 21/32* (2013.01)

(58) Field of Classification Search
CPC ....................................................... G06F 21/32
See application file for complete search history.

(56) References Cited

U.S. PATENT DOCUMENTS

| | | | |
|---|---|---|---|
| 7,653,818 B2 | 1/2010 | Serpa | |
| 8,468,584 B1* | 6/2013 | Hansen | G06Q 40/00 455/411 |
| 9,300,645 B1* | 3/2016 | Rao | H04L 63/08 |
| 2006/0206724 A1* | 9/2006 | Schaufele | G06F 21/32 713/186 |
| 2008/0136678 A1 | 6/2008 | Harrington | |
| 2009/0288148 A1* | 11/2009 | Headley | H04L 9/3271 726/5 |
| 2009/0309698 A1* | 12/2009 | Headley | G06F 21/316 340/5.52 |
| 2012/0126941 A1 | 5/2012 | Coggill | |

(Continued)

FOREIGN PATENT DOCUMENTS

| | | |
|---|---|---|
| CN | 104077512 A | 10/2014 |
| EP | 2037651 A1 | 3/2009 |
| EP | 2099203 A1 | 9/2009 |
| EP | 2487859 A1 | 8/2012 |

OTHER PUBLICATIONS

Kataria et al, A survey of automated biometricauthentication techniques, IEEE, 2013 Nirma University, Nov. 2013 (Year: 2013).*

(Continued)

*Primary Examiner* — Luu T Pham
*Assistant Examiner* — Harvey I Cohen
(74) *Attorney, Agent, or Firm* — Brown & Michaels, PC; James Nock

(57) ABSTRACT

A method for securely authenticating users of a device which uses pairings of a verbal passphrase and user interactions. The user interactions may be finger position on an interface of the device, number of taps on the interface of the device, or touching of the interface in a predefined area. Alternatively, the user can provide a verbal passphrase with inflection points.

18 Claims, 12 Drawing Sheets

(56) References Cited

U.S. PATENT DOCUMENTS

| | | | |
|---|---|---|---|
| 2012/0133484 A1 | 5/2012 | Griffin | |
| 2012/0256723 A1 | 10/2012 | Grover | |
| 2013/0069772 A1 | 3/2013 | Najafi et al. | |
| 2013/0179681 A1* | 7/2013 | Benson | H04L 9/3231 713/155 |
| 2013/0305169 A1* | 11/2013 | Gold | G09B 5/00 715/757 |
| 2015/0003693 A1* | 1/2015 | Baca | G06F 21/00 382/124 |
| 2015/0199504 A1* | 7/2015 | Feng | G06F 21/36 726/28 |
| 2015/0213244 A1* | 7/2015 | Lymberopoulos | G06F 21/32 726/18 |
| 2015/0340025 A1* | 11/2015 | Shima | G06F 21/32 704/246 |
| 2016/0063230 A1* | 3/2016 | Alten | G06F 21/32 726/28 |
| 2016/0292408 A1* | 10/2016 | Zhang | G06F 21/32 |

OTHER PUBLICATIONS

Hamilton et al, A Global Look at Authentication, IEEE, Information Assurance and Security Workshop, 2007. IAW '07. IEEE SMC, Jun. 2007 (Year: 2007).*

Varchol et al, Multimodal biometric authentication using speech and hand geometry fusion, IEEE, Systems, Signals and Image Processing, 2008.15th International Conference on, Jun. 2008 (Year: 2008).*

"Multi-Finger Pattern and Typing Rules for Enhanced Security and Control", An IP.com Prior Art Database Technical Disclosure; Jul. 2015.

Fuglerud et al. "Secure and Inclusive Authentication with a Talking Mobile One-time-password Client", IEEE Security and Privacy Magazine; vol. 9, Issue 2; Jan. 2011.

Leiva et al. "BoD Taps: An Improved Back-of-Device Authentication Technique on Smartphones", International Conference on Human-Computer Interaction with Mobile Devices and Services; Sep. 2014.

Azenkot et al. "PassChords: Secure Multi-Touch Authentication for Blind People", ACM SIGACCESS Conference on Assistive Technologies; Oct. 2012.

* cited by examiner

SECURE AUTHENTICATION OF USERS OF DEVICES USING TACTILE AND VOICE SEQUENCING WITH FEEDBACK

BACKGROUND

The present invention relates to secure authentication of users of devices, and more specifically to securing authentication of users of devices using tactile and voice sequencing with feedback.

Passphrases or codes are often used to unlock devices of users. A passphrase is a sequence of words or other text used to control access to a computer system, program, data, or device itself. A passphrase is similar to a password in usage, but is generally longer for added security. The passphrase is conventionally transmitted to the device through touch or typing. Entering the passphrase can be cumbersome for a user on a small virtual keyboard.

Passphrases may also be transmitted to a device using a "voice over" method, where a user speaks a specific passphrase in order to unlock their device. However, in a public place, the passphrase may easily be overheard by others and compromise the security of the device.

SUMMARY

According to one embodiment of the present invention, a method for securely authenticating a user to user a device. The device comprising a device computer comprising: a device computer comprising at least one processor, one or more memories, and one or more repositories, at least one interface for receiving input from a user, an audio receiver with an input and an output in communication with the device computer is used to securely authenticate a user to use a device. The method comprises the steps of: the device computer receiving an indication from the user regarding securely authenticating an identity of a user; the device computer receiving a verbal passphrase comprising a plurality of words from an output of the audio receiver; the device computer detecting a user interaction with at least one interface to provide authentication information associated with each of the plurality of words of the verbal passphrase; the device computer comparing a pairing of the detected user interaction and the plurality of words of the verbal passphrase to at least one registered pairing of user interactions and words as stored in a repository; and if the detected user interaction and words of the verbal passphrase correspond to at least one registered pairing of user interactions and words, authenticating the user to use the device.

According to another embodiment of the present invention, a method for securely authenticating a user to user a device. The device comprising a device computer comprising: a device computer comprising at least one processor, one or more memories, and one or more repositories, at least one interface for receiving input from a user, an audio receiver with an input and an output in communication with the device computer is used to securely authenticate a user to use a device. The method comprises the steps of: the device computer receiving an indication from the user regarding securely authenticating an identity of a user; the device computer receiving the verbal passphrase comprising a plurality of words from an output of the audio receiver; the device computer detecting user inflection points associated with the verbal passphrase to provide authentication information associated with at least two of the words of the verbal passphrase; the device computer comparing a pairing of the detected user inflection points and the plurality of words of the verbal passphrase to at least one registered pairings of the words of the verbal passphrase and user inflection points stored in a repository; and if the detected user inflection points and words of the verbal passphrase correspond to at least one registered pairings of the words of the verbal passphrase with user inflection pints, authenticating the user to use the device.

DETAILED DESCRIPTION

Embodiments of the present invention allow an individual or user to securely use a passphrase spoken in their voice (in lieu of a typed or written passphrase) as a passphrase in a public setting where others may be listening or can overhear the spoken passphrase. In one embodiment, the user registers different parts of an interface of the device computer with different words in the passphrase to provide authentication information to securely authenticate the user.

When the user attempts to unlock or securely gain access to the device computer, the user speaks the passphrase while touching predefined areas of a device's interface(s), with different predefined areas associated with at least some of the words of the passphrase. If the user incorrectly interacts with a portion of the interface(s) during a word of the passphrase in which it is not paired, the user is denied access to the device computer. The interface is preferably a touch user interface (TUI).

In an alternate embodiment, the user speaks a registered passphrase out of order or in some jumbled order and provides authentication information which specifies the correct, registered order of the words for the passphrase using finger positions or a varying amount of finger pressure on an interface of the device computer. In yet another embodiment, the passphrase may be registered with user voice inflections. In addition the passphrase with user inflection may be paired with finger positions or a varying amount of finger pressure on an interface of the device computer. In another embodiment, the words of the passphrase may be associated with a position of the device computer.

Figure 1:
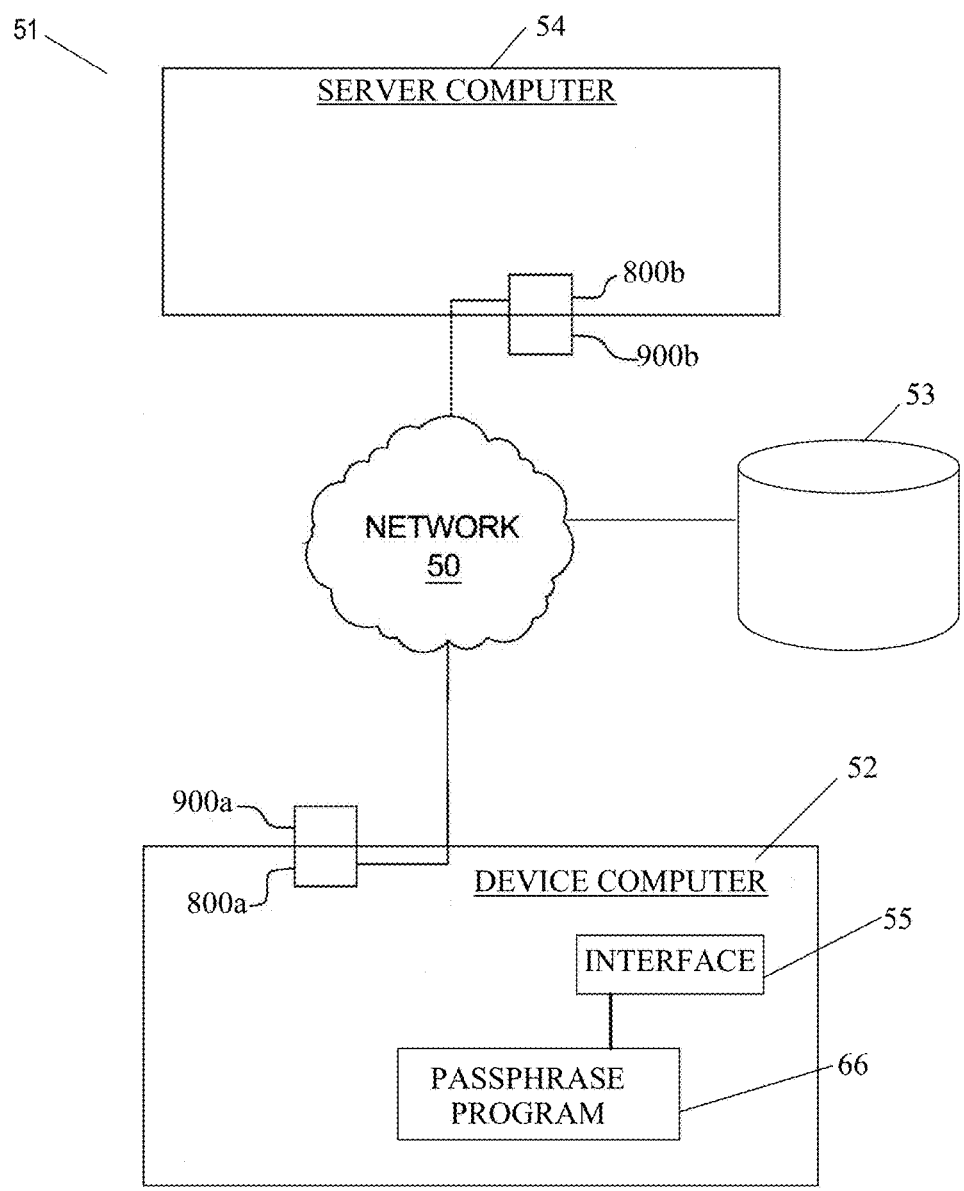
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Figure 12:
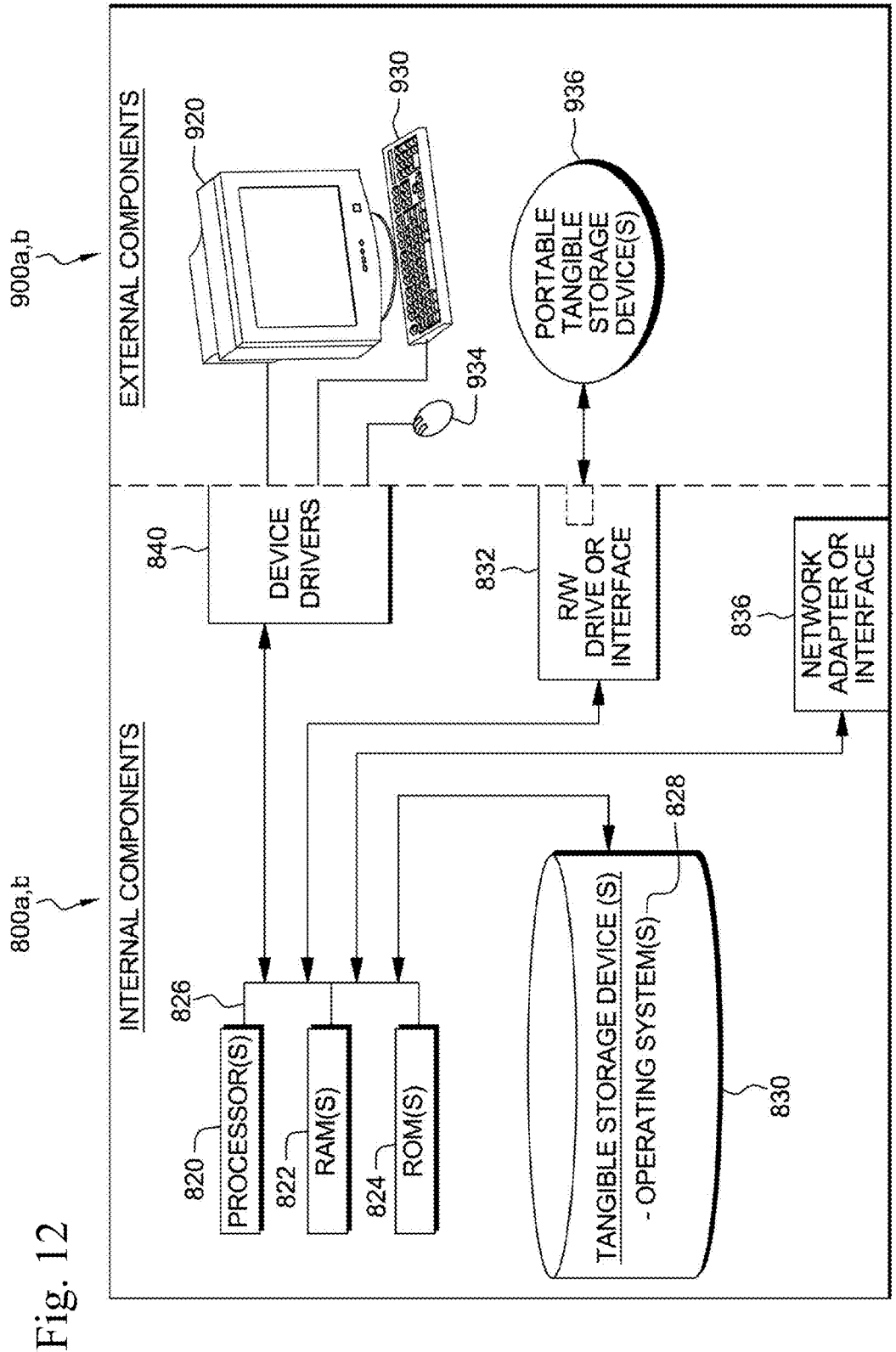
FIG. 12 illustrates internal and external components of a client or device computer and a server computer in which illustrative embodiments may be implemented.

Device computer 52 includes a set of internal components 800a and a set of external components 900a, further illustrated in FIG. 12. Device computer 52 may be, for example, a mobile device, a cell phone, a personal digital assistant, a netbook, a laptop computer, a tablet computer, a desktop computer, or any other type of computing device that has an interface which provides feedback. In a preferred embodiment, the interface is a touch interface and provides haptic feedback.

Device computer 52 may contain an interface 55. The interface 55 may accept commands and data entry from a user. The interface 55 can be, for example, a command line interface, a graphical user interface (GUI), a web user interface (WUI), a natural user interface (NUI) or a touch user interface (TUI). The device computer 52 preferably includes a passphrase program 66. While not shown, it may be desirable to have the passphrase program 66 on the server computer 54. The interface 55 also includes the ability to provide feedback to the user.

Server computer 54 includes a set of internal components 800b and a set of external components 900b illustrated in FIG. 12. In the depicted example, server computer 54 provides information, such as boot files, operating system images, and applications to device computer 52. Server computer 54 can compute the information locally or extract the information from other computers on network 50.

Program code and programs such as a passphrase program 66 may be stored on at least one of one or more computer-readable tangible storage devices 830 shown in FIG. 12, on at least one of one or more portable computer-readable tangible storage devices 936 as shown in FIG. 12, on repository 53 connected to network 50, or downloaded to a data processing system or other device for use. For example, program code and programs such as passphrase program 66 may be stored on at least one of one or more tangible storage devices 830 on server computer 54 and downloaded to the device computer 52. Alternatively, server computer 54 can be a web server, and the program code and programs such as a passphrase program 66 may be stored on at least one of the one or more tangible storage devices 830 on server computer 54 and accessed on the device computer 52. Passphrase program 66 can be accessed on device computer 52 through interface 55. In other exemplary embodiments, the program code and programs such as a passphrase program 66 may be stored on at least one of one or more computer-readable tangible storage devices 830 on server computer 54 or distributed between two or more servers.

It should be noted that for any of the devices or device computers used with the methods of the present application, for example, a mobile device, a cell phone, a personal digital assistant, a netbook, a laptop computer, a tablet computer, a desktop computer, or any other type of computing device, should have an interface which provides feedback. In a preferred embodiment, the interface is a touch interface and may be a screen or other portion of the device that can register touch from the user. In addition, the device computer also needs an audio receiver which can identify, detect, record, and listen for a user's voice. Furthermore, the device computer may also include a position sensor for detecting the position of the device computer.

Figure 2:
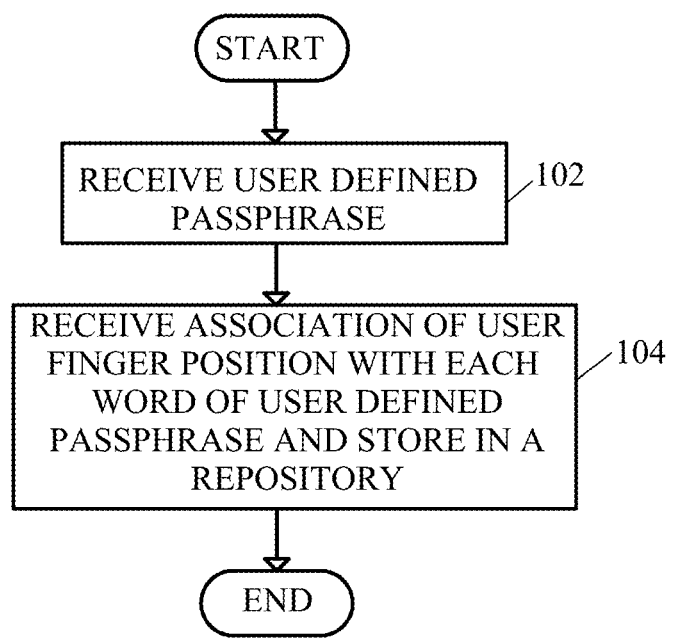
FIG. 2 shows a flow diagram of a method of registering a passphrase with specific, associated user interactions with a device computer.

FIG. 2 shows a flow diagram of a method of registering a passphrase with specific, associated user interactions with a device computer.

In a first step, a device computer receives a user defined passphrase from a user (step 102), for example by the passphrase program 66. The device computer may be prompted to "hear" or "listen" for a phrase spoken by the user. The phrase preferably contains at least three words, although the longer the phrase or the greater the number of words used in the passphrase, the greater amount of security associated with the passphrase and gaining access to the device computer. The device computer may playback the captured passphrase for the user, in order for the user to confirm that that passphrase was recorded accurately.

The device computer then receives an association of a user's finger position on a specific portion of an interface with each word of the user defined passphrase and stores the association of the finger position on the interface with each word of the user defined passphrase in a repository (step 104) and the method ends.

The device computer preferably provides feedback to the user through the device computer if the finger position/location of the user's fingers on the interface associated with each of the words in the passphrase was successfully and/or unsuccessfully captured and stored in a repository by the device computer. The feedback may be haptic, visual, or audio in nature.

If an association between a word of the user defined passphrase and the finger position/location on the interface has not been successfully paired and stored in a repository by the device computer, step 104 of receiving the association is repeated until all words of the passphrase are successfully paired and the method ends.

The repository may be repository 53 or a repository within the device computer itself, or the data may be stored in both the repository 53 and the repository within the device computer 52. The capture and storage of the association may be performed by the passphrase program 66.

Figure 3:
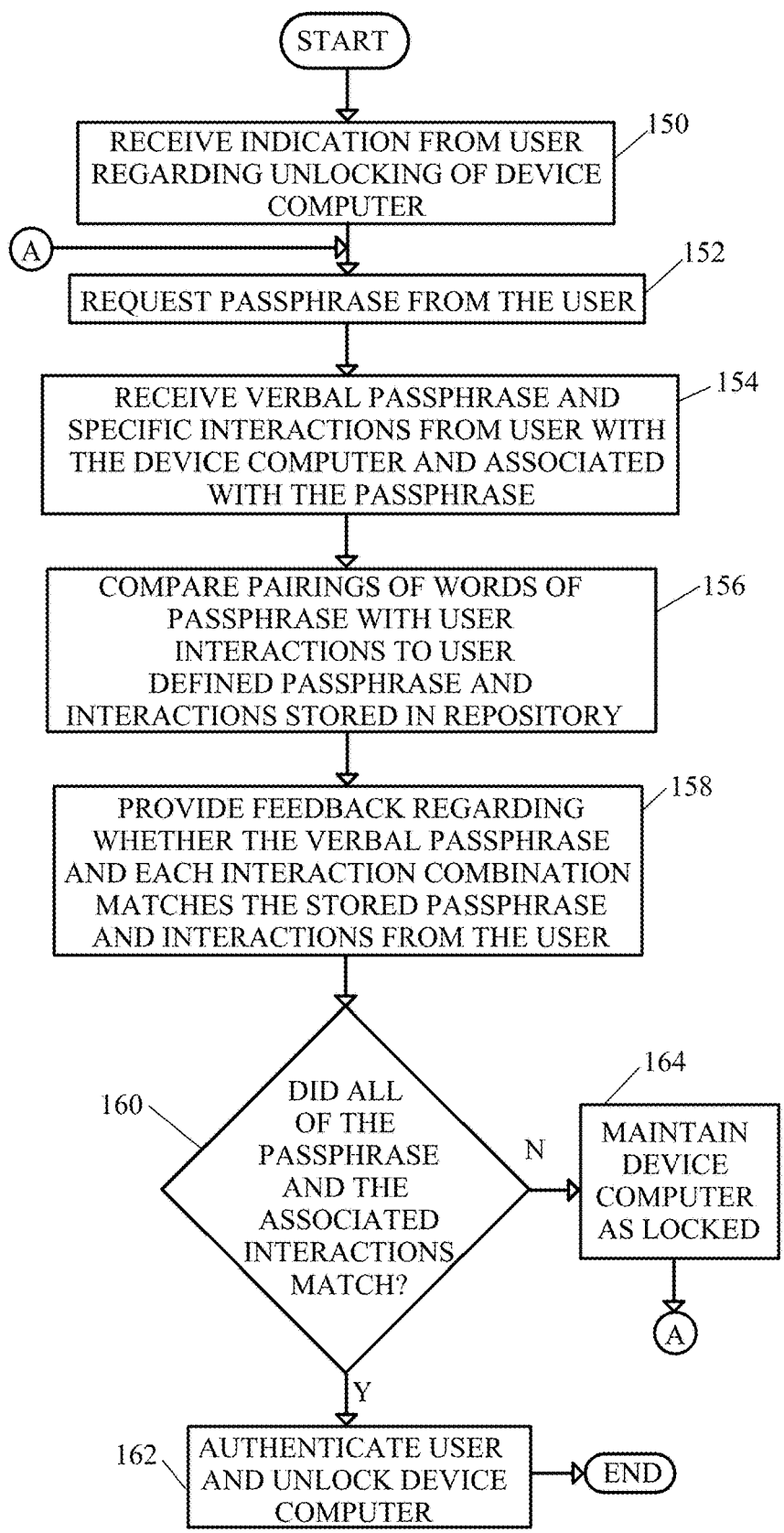
FIG. 3 shows a flow diagram of a method of unlocking the device computer using the registered passphrase with the specific, associated user interactions.

It should be noted that the method of FIG. 2 takes place prior to the steps of the method of FIG. 3.

FIG. 3 shows a flow diagram of a method of unlocking the device using the registered passphrase with the specific, associated user interactions.

In a first step, the device computer receives an indication from the user regarding unlocking the device computer or gaining access to the locked the device computer (step 150). The indication may be a touch to the touch interface, a button press on the device computer or voice command to the device computer.

The device computer requests the passphrase from the user (step 152). The request may be audio or visual in nature and is generated by the device computer, for example by the passphrase program 66. Once the request is made by the device computer to the user, the device computer may be set to "hear" or "listen" for a phrase spoken by the user through the audio receiver of the device computer.

The device computer receives the verbal passphrase and authentication information of specific interactions from the user with the device computer associated with words of the passphrase (step 154). For each of the specific interactions from the user with the device computer and associated with words of the verbal passphrase, the device computer compares the received verbal passphrase and associated specific interactions to those stored in a repository (step 156) and provides feedback regarding whether the individual words of the verbal passphrase were correctly associated with interactions of the users with the device computer (step 158), for example by the passphrase program 66.

If all of the pairings of the specific interaction of the user on the device computer with each word of the passphrase were correct (step 160), the user is authenticated and device is unlocked, granting the user access to the device computer (step 162) and the method ends.

If any of the pairings of the specific interaction of the user on the device computer with each word of the passphrase were not correct (step 160), the device computer is maintained as locked (step 164) and the method returns to step 152.

In an alternate embodiment, the specific finger position for each word of the passphrase may be replaced with the amount of pressure applied to the interface by the user, associated with or not associated with specific fingers and/or locations on the interface of the device computer. Therefore, for some words of the passphrase a minimal amount of pressure may be provided by the user versus a large amount of pressure. The amount of pressure provided for each word of the passphrase would be registered with each word just as the specific finger locations for each word in the passphrase are and is described in FIG. 2.

Figure 8:
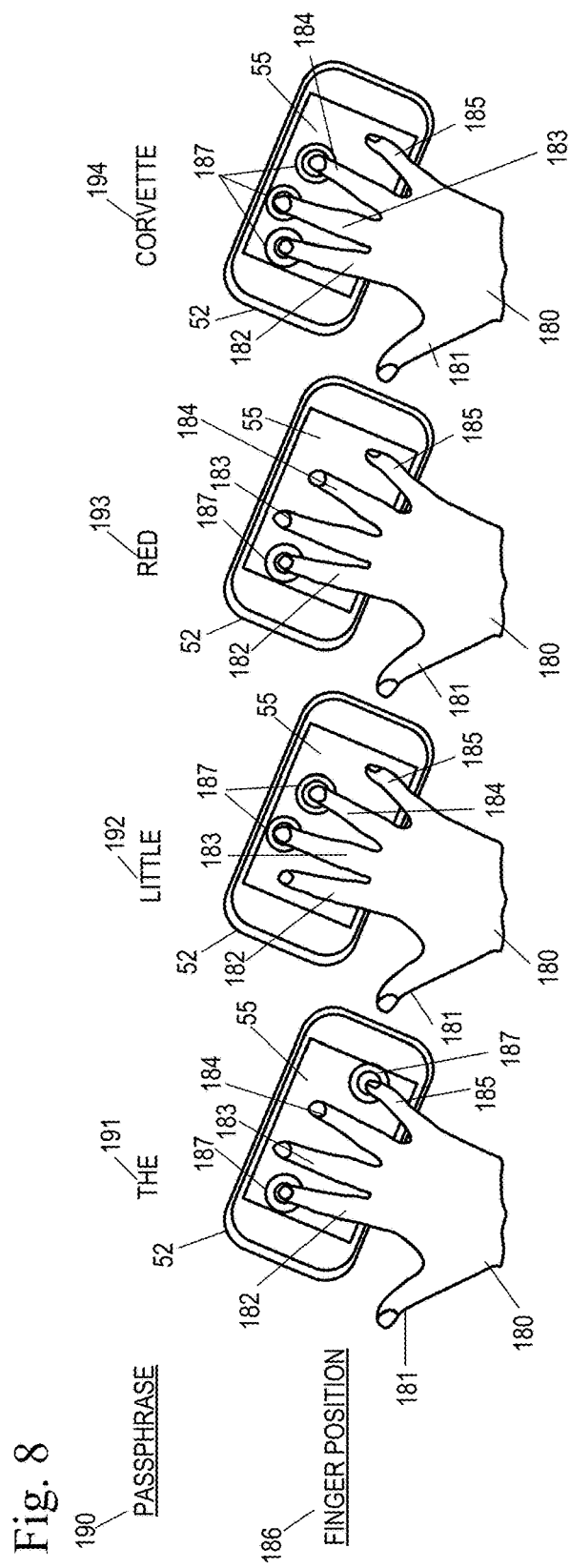
FIG. 8 shows a schematic which illustrates the method of unlocking the device computer using the registered passphrase with the specific, associated user interactions.

FIG. 8 shows a schematic which illustrates the method of unlocking the device computer using the registered passphrase with the specific, associated user interactions.

If the registered passphrase 190 of the user of the device computer 52 is "The Little Red Corvette", the user would say the passphrase and at the same time, for each word, the user would interact with an interface 55 with a specific finger or combination of fingers 186 to provide authentication information. It should be noted that "The Little Red Corvette" is just an example and the passphrase is set by a user. Furthermore, the positions of the fingers of the user shown are just an example.

As shown in FIG. 8, for the word "The" 191, the user would touch the interface 55 with a pointer finger 182 and a pinkie finger 185. If the finger combination is correctly associated with the word of the passphrase 190, feedback is provided 187 to indicate this. In this example, the feedback is visual and haptic, however other methods of providing feedback may also be used. The thumb 181, middle finger 183 and the ring finger 184 of the user's hand 180 do not touch the interface 55 of the device computer 52.

For the word "Little" of the passphrase 190, the middle finger 183 and ring finger 184 touch the interface 55 of the device computer and the rest of the fingers, the thumb 181, the pointer finger 182 and the pinkie finger 185 do not.

For the word "Red" of the passphrase 190, the pointer finger 182 touches the interface 55 of the device computer 52 and the rest of the fingers, the thumb 181, middle finger 183, ring finger 184 and pinkie finger 185 do not.

For the word "Corvette", the pointer finger 182, middle finger 183, and ring finger 184 touch the interface 55 of the device computer 52 and the rest of the fingers, the thumb 181 and pinkie finger 185 do not.

If any one of the combinations of the finger position 186 and the words of the passphrase 190 is incorrect, access to the device computer 52 is denied.

The security level (difficulty in reproducing the measures necessary to gain access to the device computer) of the passphrase 190 may be varied by the user by altering the number of words of the passphrase 190. The security level may be additional be altered by requiring that only specific fingers of a user interact with the interface 55 in combination with words from the passphrase 190. Alternatively, the interaction of the user's fingers with the interface 55 may have to be in a specific place on the interface 55 requiring specific fingers or not. In another alternative embodiment, the interface 55 may detect the user's specific fingerprints, ensuring that only the user can gain access to the device computer 52. In yet another embodiment, the interface 55 may detect the pressure of the user's fingers with the interface for each word of the passphrase.

In yet another embodiment, the specific interaction with the device computer 52 may include engaging specific sensors or interfaces of the device computer 52 in a specific order (e.g. heart rate monitor, fingerprint scanner, camera lens . . . )

It should be noted that the user may engage more than one interface 55 to provide authentication information for pairing with the words of the verbal passphrase to additionally increase the security level of the authentication of the user. The interfaces may be present in various locations on a device.

By using the combination of the passphrase and the interaction of the user with at least one interface 55 of the device 52, the chances of another user being able to gain access to the device are small. Knowing the passphrase is not enough to gain access to the device computer. To unlock the device computer 52 and be securely authenticated, both the verbal passphrase and the interactions with the device computer for each word of the passphrase must be correct.

Figure 4:
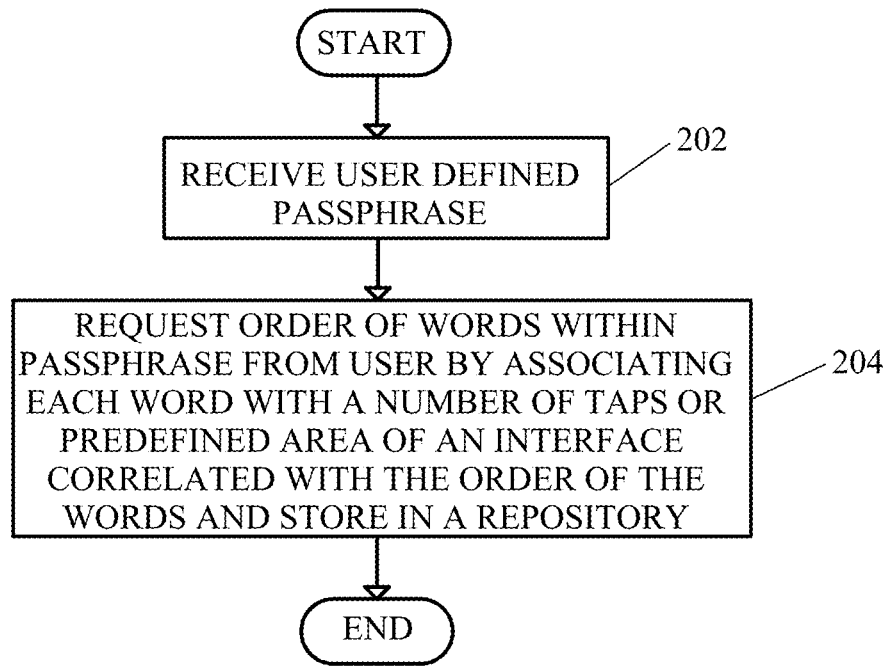
FIG. 4 shows a flow diagram of a method of registering each word of a passphrase to correlate with a number of taps or predefined area of an interface of the device computer corresponding to the order of the words of the passphrase.

FIG. 4 shows a flow diagram of a method of registering each word of a passphrase to correlate with a number of taps or predefined area of an interface of the device computer corresponding to the order of the words of the passphrase.

In a first step, a device computer receives a user defined passphrase from a user (step 202), for example by the passphrase program 66. The device computer may be prompted to "hear" or "listen" for a phrase spoken by the user. The phrase preferably contains at least three words, although the longer the phrase or the greater the number of words used in the passphrase, the greater amount of security associated with the passphrase and gaining access to the device computer. The device computer may playback the captured passphrase for the user, in order for the user to confirm that that passphrase was recorded accurately.

The device computer then requests authentication information of a number of taps or touches in a predefined area of the interface to be associated with the order of the words of the passphrase and stores the association of the number of taps or touches with the order of each word of the user defined passphrase in a repository (step 204) and the method ends.

Step 204 may be replaced with a step in which the user confirms the verbal passphrase and the device computer correlates a number of taps or user interaction with an interface of the device that should be received based on the given order of the verbal passphrase.

The device preferably provides feedback to the user through the device computer if the number of taps/location of the user's fingers on the interface associated with each of the words in the passphrase was successfully and/or unsuccessfully captured and stored in a repository by the device computer. The feedback may be haptic, visual, or audio in nature.

If an association between a word of the user defined passphrase and the number of taps/location on the interface has not been successfully paired and stored in a repository by the device computer, step 204 of receiving the association is repeated until all words of the passphrase are successfully paired and the method ends.

The repository may be repository 53 or a repository within the device computer itself, or the data may be stored in both the repository 53 and the repository of the device computer. The capture and storage of the association may be performed by the passphrase program 66.

Figure 5:
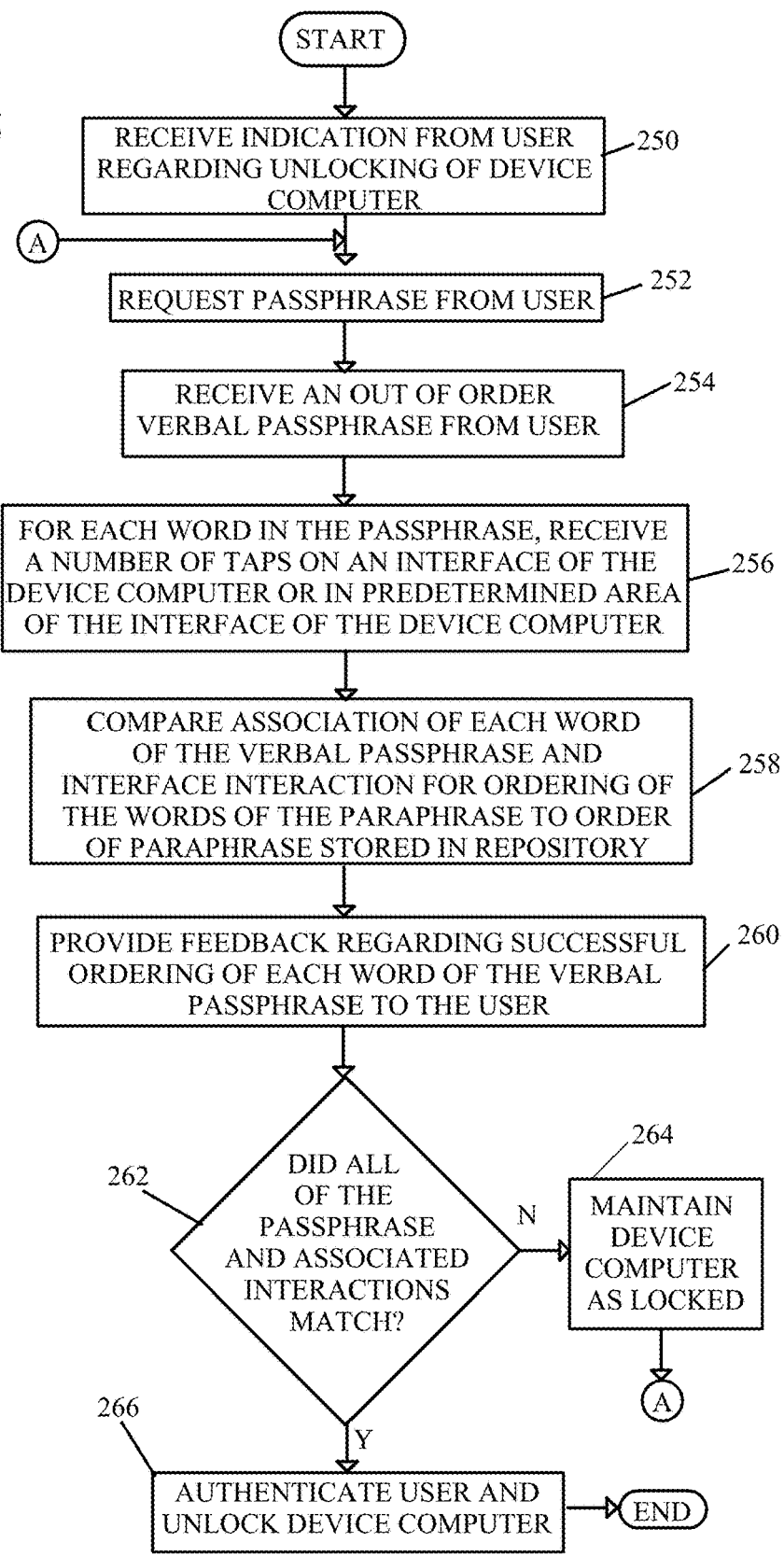
FIG. 5 shows a flow diagram of a method of unlocking a device computer using an out-of-order spoken registered passphrase and a correlated number of taps or predefined area of an interface of the device computer from the user.

It should be noted that the method of FIG. 4 takes place prior to the steps of the method of FIG. 5.

FIG. 5 shows a flow diagram of a method of unlocking a device computer using an out-of-order spoken registered passphrase and correlated number of taps or touches in a predefined area of an interface from the user.

In a first step, the device computer receives an indication from the user regarding unlocking the device computer or gaining access to the locked device computer (step 250). The indication may be a touch to the touch interface, a button press on the device or voice command to the device computer.

The device computer requests the passphrase from the user (step 252). The request may be audio or visual in nature and is generated by the device computer. Once the request is made by the device computer to the user, the device computer may be set to "hear" or "listen" for a phrase spoken by the user through the audio receives of the device computer.

The device computer receives an out-of-order verbal passphrase (step 254). The phrase "out-of-order" meaning that the order of the words provided by the user does not match the order of the registered passphrase. For example, if the phrase was "The Little Red Corvette", the out-of-order passphrase provided by the user may be "The Corvette Little Red" or multiple other combinations.

For each word spoken by the user, the device computer receives authentication information of a number of taps or touches in a predefined area of an interface of the device computer (step 256). The taps and touches correspond to an ordering of the passphrase.

For example, if the user provided the out-of-order passphrase "The Corvette Little Red", the user would tap the interface of the device computer once for "The", four times for "Corvette", twice for "Little" and three times for the word "Red". Alternatively, the fingers of a user can be designated as one, two, three, four and the order of the passphrase given by touching the interface with a specific finger. In another embodiment, the interface may be portioned into areas associated with a number. The user would tap the predefined portioned area of the interface to indicate the order of the passphrase.

For each of the words spoken and order attributed to each word of the passphrase, the device computer compares the received verbal passphrase and associated order to that stored in a repository (step 258) and provides feedback regarding whether the individual words of the verbal passphrase were correctly associated with registered order (step 260), for example by the passphrase program 66.

If all of the pairings of the words of the passphrase and the order of the words given by interaction of the user with the device computer was correct (step 262), the user is authenticated and the device computer is unlocked, granting the user access to the device computer (step 266) and the method ends.

If any of the pairings of the words of the passphrase and the order of the words given by interaction of the user with the device computer were not correct (step 262), the device computer is maintained ad locked (step 264) and the method returns to step 252.

Figure 9:
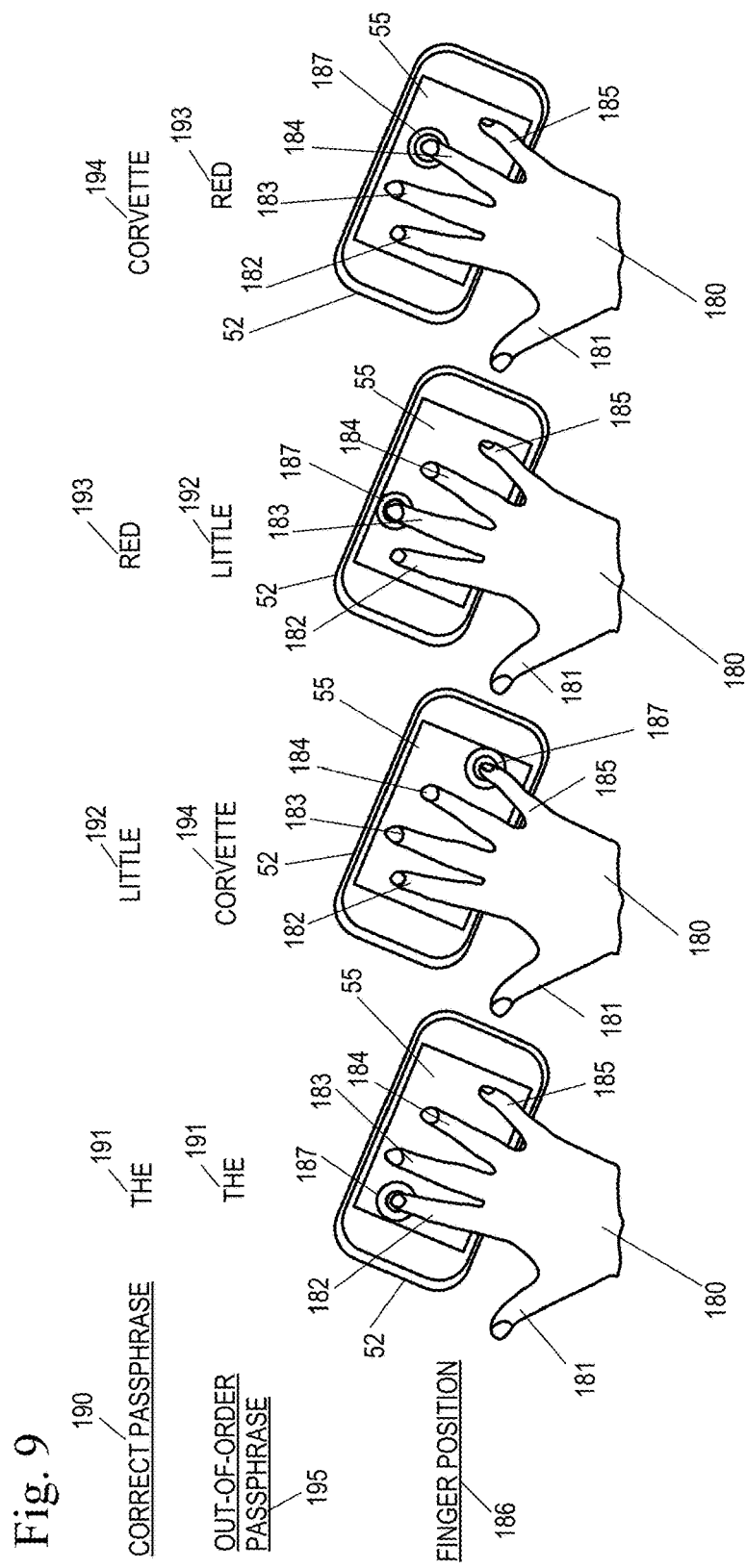
FIG. 9 shows a schematic which illustrates the method of registering each word of a passphrase to correlate with a number of taps or predefined area of an interface of the device computer corresponding to the order of the words of the passphrase.

FIG. 9 shows a schematic which illustrates the method of registering each word of a passphrase to correlate with a number of taps or predefined area of an interface of the device computer corresponding to the order of the words of the passphrase.

If the registered passphrase 190 of the user of the device computer 52 is "The Little Red Corvette", the user would say the passphrase and at the same time, for each word, the user would touch an interface 55 with a specific finger 181-185 of a hand 180 or a number of times associated with the correct order of the words.

For example, if the user provided the out-of-order passphrase "The Corvette Little Red" 195, the user would tap the interface 55 of the device computer 52 once for "The", four times for "Corvette", twice for "Little" and three times for the word "Red".

Alternatively, and as shown in FIG. 9, the fingers of a user can be designated as one, two, three, four and the order of the passphrase given by touching the interface 55 with a specific finger.

For the word "The" 191, the first word of the registered passphrase 190 of "The Little Red Corvette", the first finger, or the pointer finger 182 is tapped on an interface 55 of the device computer 52 during the speaking of this word of the out-of-order passphrase 195.

For the word "Corvette" 194, the fourth word of the registered passphrase 190 of "The Little Red Corvette", the pinkie finger 185 is tapped on an interface 55 of the device computer 52 during the speaking of this word of the out-of-order passphrase 195.

For the word "Little" 192, the second word of the registered passphrase 190 of "The Little Red Corvette", the middle finger 183 is tapped on an interface 55 of the device computer 52 during the speaking of this word of the out-of-order passphrase 195.

Lastly, for the word "Red" 193, the third word of the registered passphrase 190 of "The Little Red Corvette", the ring finger 184 is tapped on an interface 55 of the device computer 52 during the speaking of this word of the out-of-order passphrase 195.

While only one interface 55 is shown, multiple interfaces may be present. The tapping on an interface to indicate an order may be done by the user interacting with different interfaces of the device in a specific sequence.

In another embodiment, an interface may be portioned into areas associated with a number. The user would tap the predefined portioned area to indicate the order of the words of the out-of-order passphrase 195.

Feedback is given to the user regarding the pairing of specific words with passphrase order. In this example, the feedback is visual and haptic, however of methods of providing feedback may also be used.

If any one of the combinations of the finger positions 186 indicating the order of the words of the passphrase 190 is incorrect, access to the device computer 52 is denied.

The security level (difficulty in reproducing the measures necessary to gain access to the device) of the passphrase may be varied by the user by altering the number of words of the passphrase. Alternatively, the interface may detect the user's specific fingerprints, ensuring that only the user can gain access to the device computer.

By using the combination of the passphrase and the interaction of the user with the interface of the device computer, the chances of another user being able to gain access to the device computer are small. Knowing the passphrase is not enough to gain access to the device computer.

It should be noted that in the above embodiments, a natural user interface (NUI) may be used in conjunction with or in place of a touch user interface (TUI).

Figure 6:
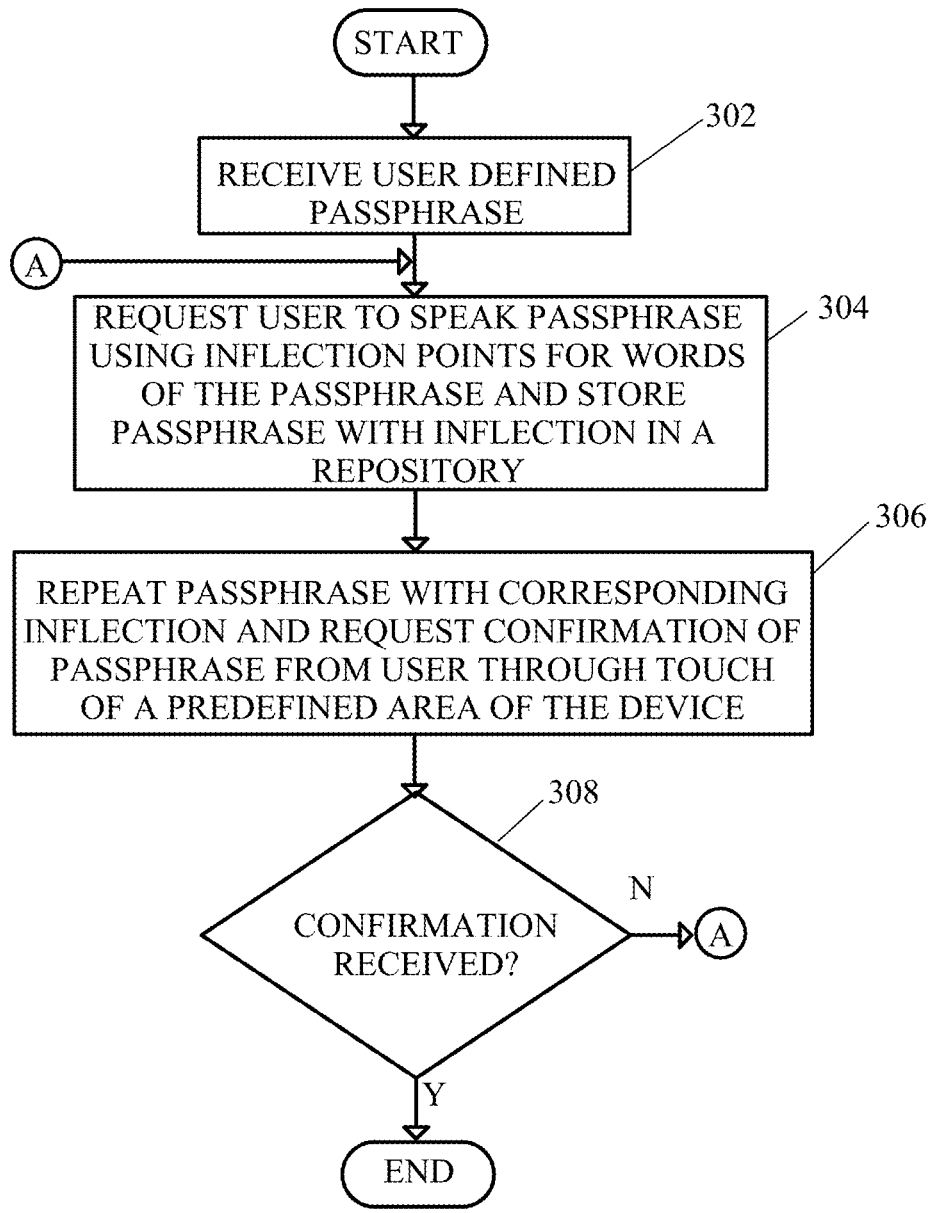
FIG. 6 shows a flow diagram of a method of registering a passphrase that includes inflection.

FIG. 6 shows a flow diagram of a method of registering a passphrase that includes inflection.

In a first step, a device computer receives a user defined passphrase from a user (step 302), for example by the passphrase program 66. The device computer may be prompted to "hear" or "listen" for a phrase spoken by the user. The phrase preferably contains at least three words, although the longer the phrase or the greater the number of words used in the passphrase, the greater amount of security associated with the passphrase and gaining access to the device computer. The device computer may playback the captured passphrase for the user, in order for the user to confirm that that passphrase was recorded accurately.

The device computer then requests the user to speak the passphrase using inflection points on certain syllables of at least one of the words of the passphrase and stores inflection points associated with the passphrase in a repository (step 304). The inflection point being a point or a series of points of a pattern or point of stress on a specific syllable of a word, more specifically the pitch and tone patterns in a person's speech: where the voice rises and falls.

The device computer then repeats the captured passphrase including the inflection points and requests confirmation from the user through an interface of the device computer (step 306). If the device computer receives confirmation (step 308), the method ends. If the device computer does not receive confirmation (step 308), the method returns to step 304.

The repository may be repository 53 or a repository within the device computer itself, or the data may be stored in both the repository 53 and the repository within the device computer 52. The capture and storage of the association may be performed by the passphrase program 66.

The inflection points for each word of the passphrase may additionally be registered with an amount of pressure provided by the user's fingers with an interface of the device, possible in a specific location of the interface of the device.

Figure 7:
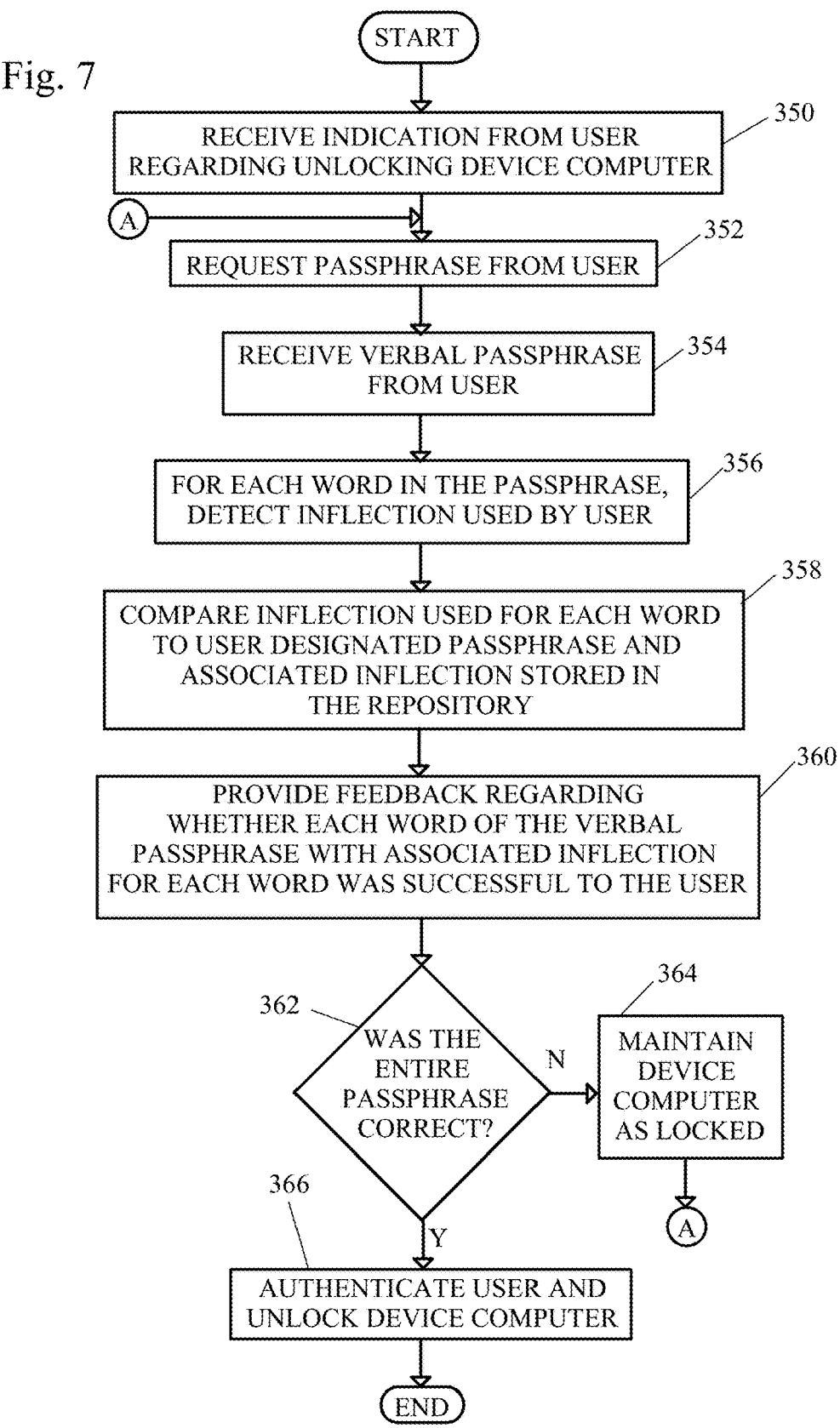
FIG. 7 shows a flow diagram of a method of unlocking a device computer using a passphrase that contains inflection.

It should be noted that the method of FIG. 6 takes place prior to the steps of the method of FIG. 7.

FIG. 7 shows a flow diagram of a method of unlocking a device computer using a passphrase that contains inflection.

In a first step, the device computer receives an indication from the user regarding unlocking the device computer or gaining access to the locked the device computer (step 350). The indication may be a touch to the touch interface, a button press on the device computer or voice command to the device computer.

The device computer requests the passphrase from the user (step 352). The request may be audio or visual in nature and is generated by the device computer. Once the request is made by the device computer to the user, the device may be set to "hear" or "listen" for a phrase spoken by the user through the audio receiver of the device computer.

The device computer receives a verbal passphrase from the user which contains inflection (step 354). Each word of the passphrase spoken is analyzed to detect inflection spoken by the user (step 356), for example using the passphrase program 66.

For each of the words spoken, the device computer compares the detected inflection points to the inflection points associated with each of the words of the passphrase stored in a repository (step 358).

The device computer provides feedback regarding whether the individual words of the verbal passphrase contained the correct inflection (step 360), for example by the passphrase program 66.

If the inflection points of all of the words of the passphrase match the inflection points of the passphrase stored in the repository (step 362), the user is authenticated and the device computer is unlocked, granting the user access to the device computer (step 366) and the method ends.

If any of the inflection points of the words of the passphrase do not match the inflection points of the passphrase stored in the repository (step 362), the device computer is maintained as locked (step 364) and the method returns to step 352.

It should be noted that a user may also use touch sequences as described previously in combination with the speaking the passphrase with inflection to provide additional security.

If the inflection points for each word of the passphrase were additionally be registered with an amount of pressure provided by the user's fingers with an interface of the device or other touch sequences, both the inflection and the touch sequence or pressure provided by the user would need to be correct in order to grant the user access to the device computer.

Figure 10:
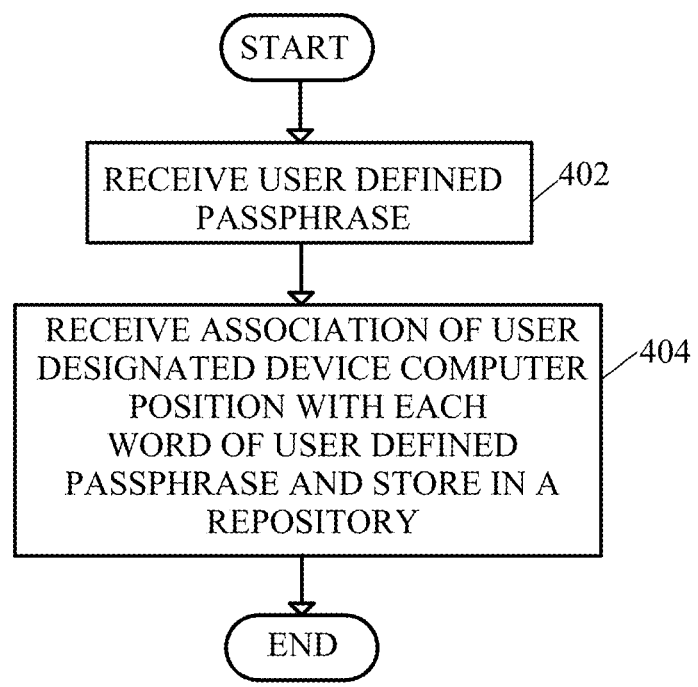
FIG. 10 shows a flow diagram of a method of registering a passphrase with specific, associated user interactions with a device computer, such as position of the device computer.

FIG. 10 shows a flow diagram of a method of registering a passphrase with specific, associated user interactions with a device computer.

In a first step, a device computer receives a user defined passphrase from a user (step 402), for example by the passphrase program 66. The device computer may be prompted to "hear" or "listen" for a phrase spoken by the user. The phrase preferably contains at least three words, although the longer the phrase or the greater the number of words used in the passphrase, the greater amount of security associated with the passphrase and gaining access to the device computer. The device computer may playback the captured passphrase for the user, in order for the user to confirm that that passphrase was recorded accurately.

The device computer then receives an association of a position of the phone from a position sensor of the device computer and stores the position of the device computer with the user defined passphrase in a repository (step 404) and the method ends.

The position sensor may for example be an accelerometer which detects movement of the device computer. The accelerometer may detect the orientation of the device computer, for example, a display screen. The accelerometer may detect an angle of tilt of the device computer relative to the device computer laying flat. The accelerometer may be a three-axis accelerometer which detects some motion input of the device computer.

For example, the device computer may be held flat for a first word of the passphrase, tilted to the left for a second word of the passphrase, and tilted to the right for a third word of the passphrase. The position of the device computer for each of the words of the passphrase is preferably detected by the position sensor of the device computer.

The device computer preferably provides feedback to the user through the device computer if the position of the device computer associated with each of the words in the passphrase was successfully and/or unsuccessfully captured and stored in a repository by the device computer. The feedback may be haptic, visual, or audio in nature.

If an association between a word of the user defined passphrase and the position of the device computer has not been successfully paired and stored in a repository by the device computer, step 404 of receiving the association is repeated until all words of the passphrase are successfully paired and the method ends.

The repository may be repository 53 or a repository within the device computer itself, or the data may be stored in both the repository 53 and the repository within the device computer 52. The capture and storage of the association may be performed by the passphrase program 66.

Figure 11:
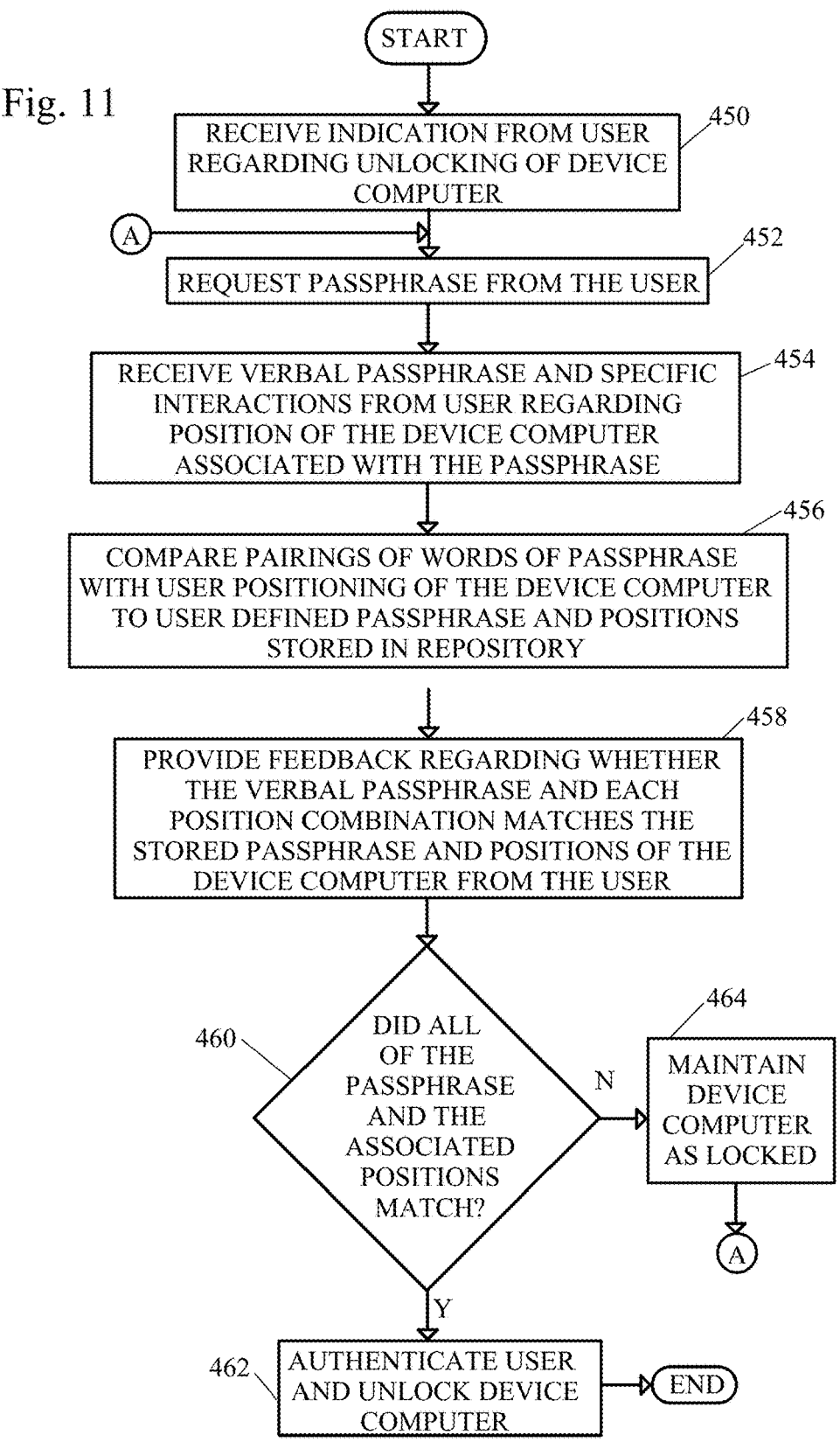
FIG. 11 shows a flow diagram of a method of unlocking the device computer using the registered passphrase with the specific, associated user interactions, such as position of the device computer.

It should be noted that the method of FIG. 10 takes place prior to the steps of the method of FIG. 11.

FIG. 11 shows a flow diagram of a method of unlocking the device computer using the registered passphrase with the specific, associated user interactions, such as pressure.

In a first step, the device computer receives an indication from the user regarding unlocking the device computer or gaining access to the locked the device computer (step 450). The indication may be a touch to the touch interface, a button press on the device computer or voice command to the device computer.

The device computer requests the passphrase from the user (step 452). The request may be audio or visual in nature and is generated by the device computer, for example by the passphrase program 66. Once the request is made by the device computer to the user, the device computer may be set to "hear" or "listen" for a phrase spoken by the user through the audio receiver of the device computer.

The device computer receives the verbal passphrase and authentication information of specific interactions from the user regarding the position of the device computer associated with words of the passphrase (step 454). For each of the specific interactions from the user regarding the position of the device computer and associated with words of the verbal passphrase, the device computer compares the received verbal passphrase and associated positioning of the device computer to those stored in a repository (step 456) and provides feedback regarding whether the individual words of the verbal passphrase were correctly associated with positions of the device computer (step 458), for example by the passphrase program 66.

If all of the pairings of the specific positions of the device computer provided by the user with each word of the passphrase were correct (step 460), the user is authenticated and device is unlocked, granting the user access to the device computer (step 462) and the method ends.

If any of the pairings of the specific positions of the device computer provided by the user with each word of the passphrase were not correct (step 460), the device computer is maintained as locked (step 464) and the method returns to step 452.

FIG. 12 illustrates internal and external components of device computer 52 and server computer 54 in which illustrative embodiments may be implemented. In FIG. 12, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and passphrase program 66 are stored on one or more of the computer-readable tangible storage devices 830 for execution by one or more of the processors 820 via one or more of the RAMs 822 (which typically include cache memory). In the embodiment illustrated in FIG. 12, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Passphrase program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Passphrase program 66 can be downloaded to the device computer 52 and server computer 54 from an external computer via a network (for example, the Internet, a local area network or other, wide area network) and network adapter or interface 836. From the network adapter or interface 836, passphrase program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Passphrase program 66 can be written in various programming languages including low-level, high-level, object-oriented or non object-oriented languages. Alternatively, the functions of a passphrase program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method for securely authenticating a user to use a device, the device comprising: a device computer comprising at least one processor, one or more memories, and one or more repositories, at least one interface for receiving input from a user, an audio receiver with an input and an output in communication with the device computer, the method comprising the steps of:

receiving, by the device computer, an indication from the user regarding securely authenticating an identity of a user;

receiving, by the device computer, a verbal passphrase out of order, the verbal passphrase comprising a plurality of words from an output of the audio receiver;

detecting, by the device computer, a user interaction comprising simultaneous contact of at least one finger of the user with the at least one interface in a plurality of predefined areas of the at least one interface to provide authentication information associated with each of the plurality of words of the verbal passphrase being received by the device computer as input from the user, wherein the simultaneous contact of the user with a predefined area of the plurality of predefined areas of the at least one interface indicates a specific order designation of a word of the verbal passphrase received out of order, the specific order designation for the word ordering the out of order words received by the device computer as verbal input from the user in a registered pairing, wherein each designated predetermined area of the at least one interface corresponds to one of the words of the verbal passphrase;

reordering, by the device computer, the words of the verbal passphrase in accordance with the user interaction on at least one interface;

comparing, by the device computer, a pairing of the detected user interaction comprising simultaneous contact with the predefined area of the at least one interface and the plurality of words of the verbal passphrase to at least one registered pairing of user interactions and words as stored in a repository; and if the detected user interaction and words of the verbal passphrase correspond to at least one registered pairing of user interactions and words, authenticating, by the device computer, the user to use the device.

2. The method of claim 1, in which at least one position of the at least one finger of the user on at least one of the interfaces is associated with each word of the verbal passphrase in the registered pairings of user interactions and words in the repository.

3. The method of claim 1, further comprising registering, by the device computer, pairings of user interactions with words, comprising the steps of:

receiving, by the device computer, a user defined verbal passphrase from an output of an audio receiver;

receiving, by the device computer, user interaction with the at least one interface of the device for each of the words of the verbal passphrase; and storing, by the device computer, the pairings of each of the words of the verbal passphrase with the user interaction as registered pairings in a repository.

4. The method of claim 1, wherein the detected user interaction is finger contact with the interface within the predefined area of at least one of the interfaces.

5. The method of claim 1, wherein the detected user interaction is a number of taps on at least one interface of the device in the predefined areas of the at least one interface.

6. The method of claim 1, wherein the device computer provides feedback regarding each of the pairings of the detected user interaction and words of the verbal passphrase.

7. The method of claim 6, wherein the feedback is haptic.

8. The method of claim 6, wherein the feedback is visual.

9. The method of claim 6, wherein the feedback is audio.

10. A computer program product for securely authenticating a user to use a device, the device comprising: at least one processor, one or more memories, and one or more repositories, at least one interface for receiving input from a user, an audio receiver with an input and an output in communication with the device computer, the computer program product comprising a non-transitory computer readable storage medium having program instructions embodied therewith, the program instructions executable by the computer to perform a method comprising:

receiving, by the device computer, an indication from the user regarding securely authenticating an identity of a user;

receiving, by the device computer, a verbal passphrase out of order, the verbal passphrase comprising a plurality of words from an output of the audio receiver;

detecting, by the device computer, a user interaction comprising simultaneous contact of at least one finger of the user with the at least one interface in a plurality of predefined areas of the at least one interface to provide authentication information associated with each of the plurality of words of the verbal passphrase being received by the device computer as input from the user, wherein the simultaneous contact of the user with a predefined area of the plurality of predefined areas of the at least one interface indicates a specific order designation of a word of the verbal passphrase received out of order, the specific order designation for the word ordering the out of order words received by the device computer as verbal input from the user in a registered pairing, wherein each designated predetermined area of the at least one interface corresponds to one of the words of the verbal passphrase;

reordering, by the device computer, the words of the verbal passphrase in accordance with the user interaction on at least one interface;

comparing, by the device computer, a pairing of the detected user interaction comprising simultaneous contact with the predefined area of the at least one interface and the plurality of words of the verbal passphrase to at least one registered pairing of user interactions and words as stored in a repository; and if the detected user interaction and words of the verbal passphrase correspond to at least one registered pairing of user interactions and words, authenticating, by the device computer, the user to use the device.

11. The computer program product of claim 10, in which at least one position of the at least one finger of the user on at least one of the interfaces is associated with each word of the verbal passphrase in the registered pairings of user interactions and words in the repository.

12. The computer program product of claim 10, further comprising registering, by the device computer, pairings of user interactions with words, comprising the program instructions of:

receiving, by the device computer, a user defined verbal passphrase from an output of an audio receiver;

receiving, by the device computer, user interaction with the at least one interface of the device for each of the words of the verbal passphrase; and storing, by the device computer, the pairings of each of the words of the verbal passphrase with the user interaction as registered pairings in a repository.

13. The computer program product of claim 10, wherein the detected user interaction is finger contact with the interface within the predefined area of at least one of the interfaces.

14. The computer program product of claim 10, wherein the contact of the at least one finger of the user with the at least one interface is a number of taps on the at least one interface of the device in the predefined areas of the at least one interface.

15. The computer program product of claim 10, wherein the device computer provides feedback regarding each of the pairings of the detected user interaction and words of the verbal passphrase.

16. The computer program product of claim 15, wherein the feedback is haptic.

17. The computer program product of claim 15, wherein the feedback is visual.

18. The computer program product of claim 15, wherein the feedback is audio.

* * * * *